United States Patent [19]
Jones

[11] Patent Number: 5,303,677
[45] Date of Patent: Apr. 19, 1994

[54] PET ENTRANCE PAGER

[76] Inventor: George D. Jones, 9210 5th St., Lanaham, Md. 20706

[21] Appl. No.: 41,042

[22] Filed: Mar. 31, 1993

[51] Int. Cl.⁵ .......................................... A01K 15/00
[52] U.S. Cl. .................................. 119/174; 119/905; 340/286.11; 340/573
[58] Field of Search ............... 119/29, 19, 174, 15; 340/573, 286.11, 384 E, 546

[56] References Cited

U.S. PATENT DOCUMENTS

| | | | |
|---|---|---|---|
| 3,656,141 | 4/1972 | Hill | 340/573 |
| 3,938,120 | 2/1976 | O'Connell | 340/274 R |
| 4,258,359 | 3/1981 | McLamb | 340/546 |
| 4,400,696 | 8/1983 | Klingensmith | 119/174 |
| 4,414,921 | 11/1983 | Cozzi | 119/29 |
| 4,506,257 | 3/1985 | Roberts, Sr. | 340/573 |
| 4,551,713 | 11/1985 | Aossey | 340/573 |
| 4,686,504 | 8/1987 | German | 340/384 E |
| 4,808,974 | 2/1989 | Cantley | 340/546 |
| 5,038,703 | 8/1991 | Frush | 119/29 |

Primary Examiner—Gene Mancene
Assistant Examiner—Todd E. Manahan
Attorney, Agent, or Firm—Robert Halper

[57] ABSTRACT

A pet entrance pager in the form of a channel like member designed to be fitted over the vertical edge of a door and held tightly against the sides by a non-skid material. The rear of the channel is fitted with an alarm assembly activated by a cover plate spring mounted on one of the channel sides and having a switch, which when activated by an animal pushing on the cover plate trips the alarm assembly. To attract the animal the pager is sprayed with scent. In the event the door is not of standard size inserts are placed channel and the door.

7 Claims, 2 Drawing Sheets

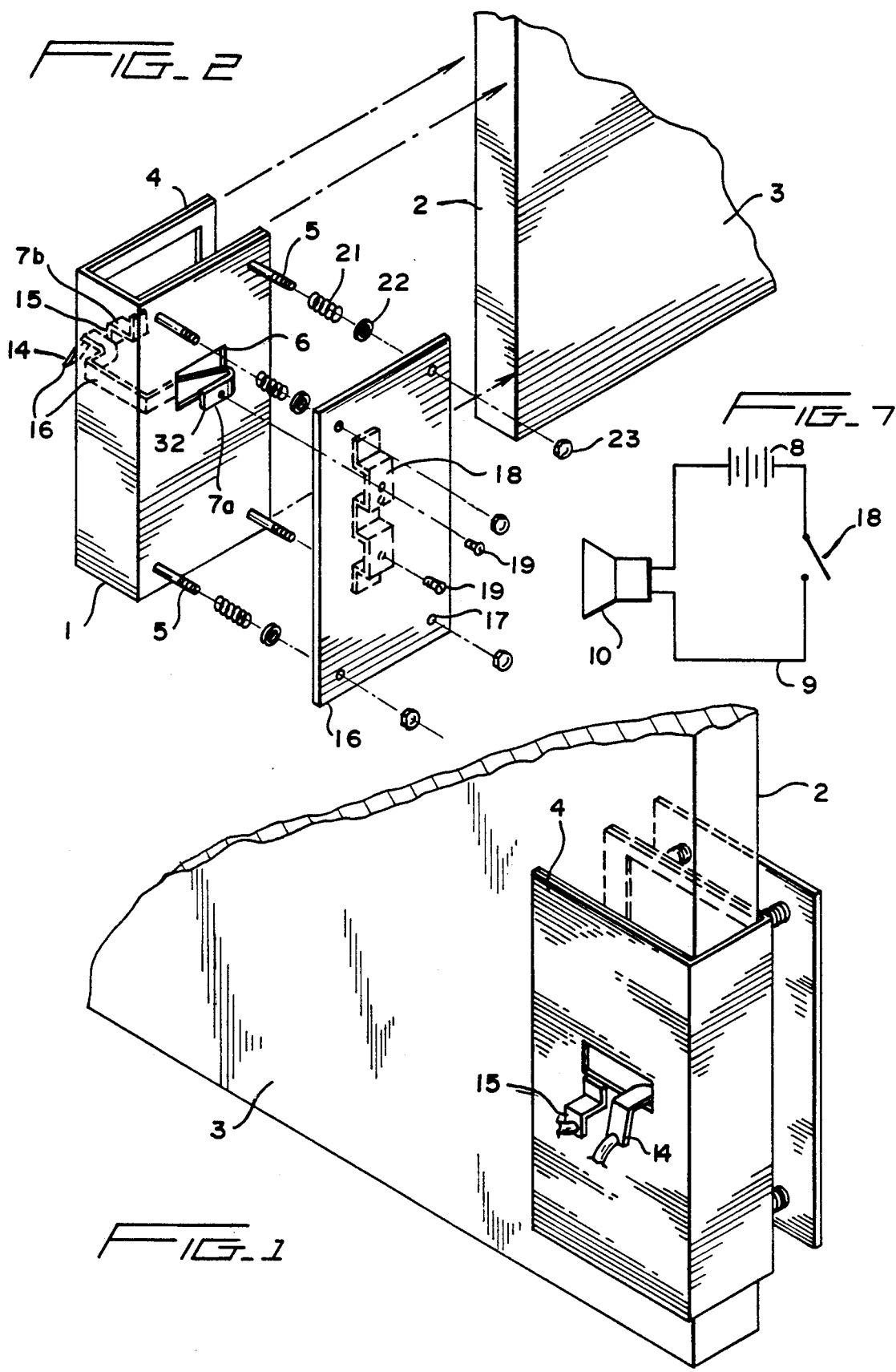

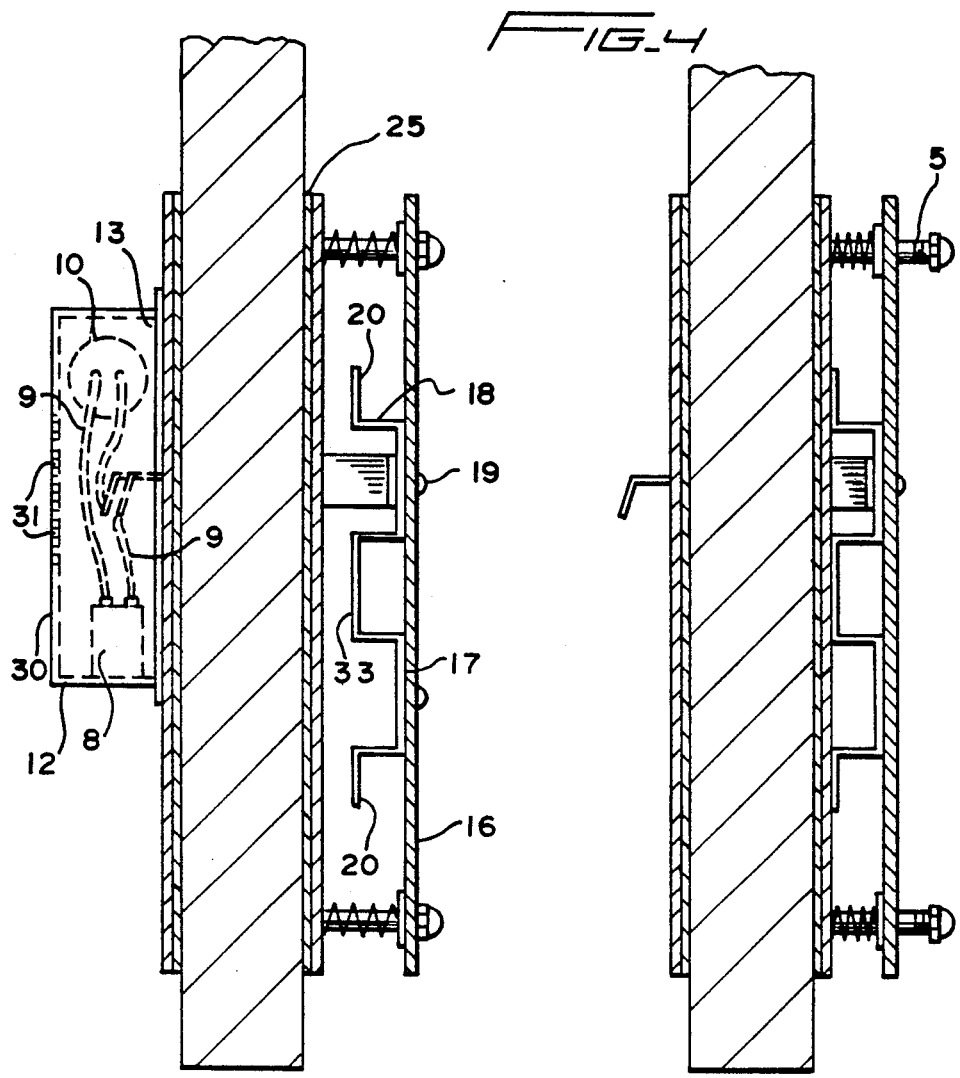
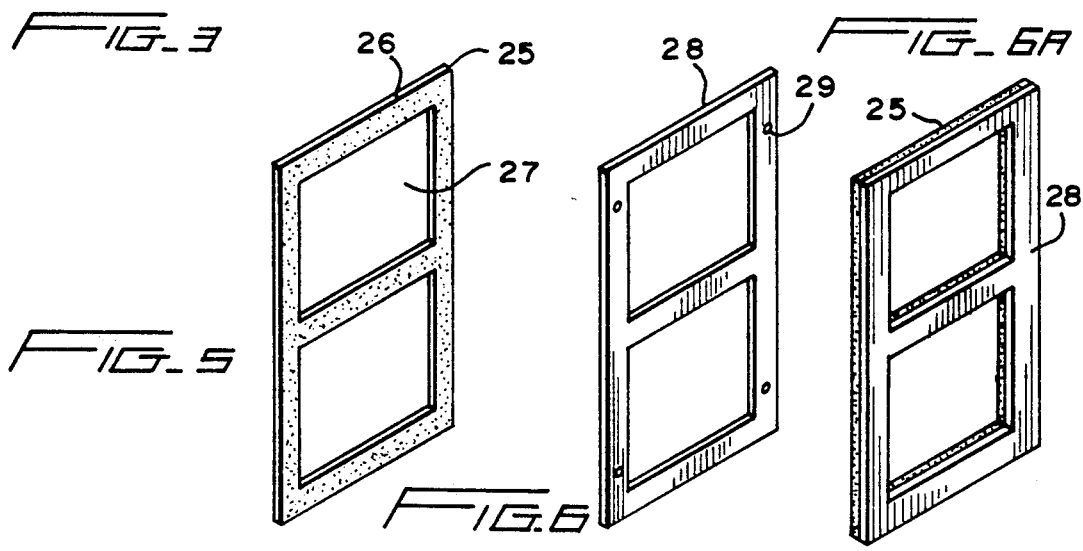

5,303,677

PET ENTRANCE PAGER

BACKGROUND OF THE INVENTION

The present invention is directed to a signalling device to assist animals in gaining entrance to or access from a building such as a house by sounding an alarm.

There are at least two pertinent inventions directed to the same subject matter. One, U.S. Pat. No. 4,400,696 shows a hinged switch mounted to a door. When the switch is activated by the animal, either a horn or light or both are energized. To assist in training the animal suitable animal candies or food are placed in a U-shaped holder attached to the hinge support. While this device is effective, the main objection is that the door is defaced since both the switch and the casing holding the alarm assembly are screwed to the door. The other invention, U.S. Pat. No. 4,686,504 has a buzzer or chime mounted on a wall adjacent the door. The mounting means consists of strips of Velcro, so that the position of the so-called annunciator can be readily moved. To assist in training the animal, the actuating lever is made of a bright contrasting color. This type of mounting would seem to create several problems. If the alarm is enclosed in a box on the outside of the wall, the sound is less likely to be heard. The animal might find it hard to get accustomed to such a location, even if the lever is made of a distinctive color. Animals have a tendency to scratch or paw at a door or similar enclosure. For example, if a pet were to be confined to a secluded room for one reason or another, the animal would emit sounds to attract attention as well as pawing or scratching the door, but not the adjacent walls.

It is a primary object of this invention to provide a pet paging device operable by an animal which is mounted on the door in such a way that the door is not defaced.

It is another object of the invention to use a switch mounted pager which is readily operable by a light touch or push of the animal's paw.

It is still another object of the invention to provide a device to which the animal is readily attracted by use of a specific scent so that little training is required.

SUMMARY OF THE INVENTION

The invention, described as a Pet Entrance Pager or Pep is mounted on a door in such a manner that the door is not defaced. The device in question comprises a channel like metal member which is slipped over the end of the door on the side where the handle is and held firmly in place on the door edge by a soft non-skid material which lines the insides of the channel member. Exemplary of patents which show door alarms that are slipped over a door and have actuating levers are U.S. Pat. Nos. 3,938,120, 4,258,359 and 4,808,974. However, none of these devices would be suitable for attracting an animal since they are placed on the top of the door. The channel is made to fit over a standard 1¾" door; however, if the door is of a lesser thickness, inserts can be fitted in the channel. Fastened to this channel on the outside of the door is a preferably plastic cover plate, which is of a hard material that resists severe weather conditions as well as scratching of the animal. The inside of the cover plate has a switch in the form of a metal contactor mounted thereon, which is held away from completing the electrical circuit by being spring mounted. When the animal pushes or scratches against the cover plate, the contactor will close the circuit actuating a bell or horn or other type of an alarm mounted on the channel facing the inside of the door. The contacts for the switch comprise two bands of spring metal. One of these bands passes through slits in the channel located both on the side facing the outer panel and the inner panel of the door. This band does not pass through the door but rather skirts the interior of the channel and exits out the slit facing the inside of the door. The other band is fastened below the slit on the leg of the channel adjacent the inside of the door. The bands are electrically connected to an alarm device by way of a battery. The battery and the alarm device are encased in a housing fastened to a leg of the channel that encloses the inside of the door. The housing has slits so as to facilitate the emission of sound.

BRIEF DESCRIPTION OF THE DRAWINGS

FIG. 1 shows a complete assembly of the pet entrance pager mounted on the edge of a door.

FIG. 2 is a perspective view showing the channel with its electrical connecting members and the cover plate with switch that is to be mounted on the channel.

FIG. 3 is a side view showing the switch in the open position, the channel and the alarm assembly in its housing.

FIG. 4 is a side view showing the switch in closed position.

FIG. 5 is a perspective view of the lining for the channel.

FIG. 6 is a perspective view of the insert.

FIG. 6a is a perspective view showing the lining adhesively bonded to the insert.

FIG. 7 is a electrical circuit diagram.

DESCRIPTION OF THE PREFERRED EMBODIMENT

FIG. 1 shows a pet entrance pager 1 mounted at an appropriate level of a door edge 2 adjacent the side of the door handle of a conventional 1¾" door 3. The pager is shown mounted on a left handed door although it could just as well be installed on a right handed door.

FIG.'s 2, 3 and 4 show in more detail the pager, which comprises a channel like member 4 having dimensions about 5"×11"×1-25/32" and preferably made of aluminum. Extending from the side of the channel away from the outer side of the door are mounted four studs 5. These studs are spaced so as to be located near the edges of the door. Located midway between the studs, but at a lower distance from the top edge is a rectangular slit 6. A similar slit is located on the backside of the channel and in the same relative position. Passing through these slits is band 7a. This band skirts along the side of the channel and the door edge and emerges through the rear slit. At the rear the band has a tab 14 that connects to the positive pole of a nine volt battery 8 through wiring 9. The other band 7b which is isolated from band 7a and is in the shape of an inverted Z is soldered to the backside of the channel just below the slit. This band has a tab 15 which is connected to a terminal on alarm 10 by another wire 9. Thence to complete the circuit another wire 9 is connected from the negative pole to a second terminal on the alarm. The bands are made of spring steel and are quite flexible. The entire alarm assembly is enclosed in a box like casing 12 having a flanged wall 13 which is soldered to the backside of the channel. Wall 30 opposite the flanged wall has a series of slits 31 to allow for diffusion of sound. Band 7a has a tab 32 at its front end and protrudes slightly from the channel slit. Cover plate 16 is dimensionally 5"×11"×¼". Appropriate holes 17 aligned with the studs in the channel are drilled near the four edges of the plate. On the inside of the cover plate, facing the outside leg of the channel, is a switch 18 in the form of a bent metal contactor strip having legs 20 and protrusion 33. The switch is secured to the cover plate by two machine screws 19, the upper one of which also secures tab 32 of band 7a to the switch. The cover plate is hung on the four studs of the channel and is secured to the same by passing a spring 21 over the stud a washer 22 and a cap nut 23. The cover plate is thus spring mounted to the channel so that there is a slight gap between the contactor strip legs 20, protrusion 33 and the outer leg of the channel 4. When an animal scratches or pushes the cover plate that plate will move forward so that contact is made between the channel and contactor strip legs and protrusion completing an electric circuit and sounding an alarm or signal. In order to induce the animal to use the pager, it has been found that if the cover plate is sprayed with a scent attractive to animals, the animal will be trained to use the device very shortly after its installation. For example, musk is a favorite scent of dogs and fish oils are a favorite for cats.

FIG. 5 is a front view showing the use of a non skid rubber type material sold under the trade mark "Scott-Gard" and adhesively bonded to the interior sides of the channel. This non skid material 25 is the same length and width as the channel sides and is about 1/16" thick. The material has a series of irregular perforations 26 on its face and preferably has rectangular cut outs 27 both on the bottom and the top, separated by a band of material that runs transversely across its mid section.

FIG. 6 shows a perspective view of inserts 28 that are used in the event the door is not of the standard 1¾" thickness. These inserts are 5"×11"×¼" and when used, as shown in FIG. 6a, are adhesively bonded on one side with a layer of the non-skid material so that when placed between the channel with its bonded non-skid material and an outer door panel, the non-skid material on the insert will also adhere to the outer door panel. These inserts may be made of wood, metal or plastic. The end of the stud facing the outside door panel is smoothed off and recessed slightly so as not to mark the door panel. The stud is held secure by being soldered to the aluminum channel.

FIG. 7 is a circuit diagram showing electrical wiring 9 connecting the battery, the alarm and switch with the positive pole connected to the switch, the negative pole connected to one terminal on the alarm and the other terminal connected to the rest of the wiring with the switch being in the open position.

While the pet entrance pager has been shown as placed on the outside of the door to signal a person within that an animal wishes to gain entrance, it could also be placed on the inside of the door to signal a person that the animal wishes to go out, or the pager could be designed with contacting switches on both the inside and the outside of the house. While the pager would have its principal use with domestic pets such as dogs and cats or almost any domestic animal, the pager has other applications as well. For example, it could be adapted by people who are bedridden or require the use of wheel chairs. The pager could be mounted on the leg of the wheel chair and a person would need only give a light touch to activate it or it could be fastened to a headboard and the contactor be activated by the movement of a hand.

While what is shown is a preferred embodiment of the invention, it should be understood that many modifications could be made without departing from the spirit of the invention.

I claim:

1. A pet entrance pager that attracts the attention of a person to allow an animal to gain access to the entrance of a building comprising:
   A. a channel that fits tightly around the vertical edge of a door adjacent the side of the door that contains a handle, said door having an inner and an outer panel;
   B. said channel having inner sides and an edge therebetween, outer sides and four corners respectively adjacent said inner and outer door panel, a non-skid rubber material bonded to said inner sides, said non-skid material frictionally adhering to said inner and outer door panels;
   C. aligned front and rear slits in each of the channel sides, a first band of conductive material having a tab extending outwardly of the channel, said band having a hole in the tab and bent section that extends inwardly and skirts the sides of said channel legs and edge of the channel and emerges through said rear slit, a second conductive band in the form of an inverted "z" fastened below said rear slit and adjacent said first band, said bands being electrically connected to an alarm assembly;
   D. said alarm assembly being encased in a housing having a flanged wall fastened to one of said outer sides of said channel on the inner door panel, said housing having a wall opposite said flange wall, said opposite wall having slits therein to aid in diffusion of sound when the alarm assembly is contacted; and
   E. a plastic cover plate having an inner and outer side and spring mounted to said channel outer side away from said outer door panel, a contactor switch screwed to the inner side of said cover plate, said switch being fastened to said first conductive band having a tab, said contactor switch making electrical contact with said second adjacent band when said cover plate is pushed inwardly by said animal.

2. The pet entrance pager of claim 1 wherein said alarm assembly includes a battery and horn, said first band having a tab located outwardly from said rear slit electrically connected to the positive pole of the battery, said second band having a tab electrically connected to said horn and additional ontacting means extending from said horn to the negative pole of the battery.

3. The pet pager of claim 1 wherein said non-skid material is of the same dimensions as said channel inner sides, is ¼" thick and has rectangular cut-outs adjacent the top and bottom of the non-skid material.

4. The pet pager of claim 1 further comprising inserts to compensate for a diminished door thickness, said inserts being placed between said channel outer side away from the outer door panel and said cover plate, said inserts having the dimensions 5"×11"×¼" and having rectangular cut-outs adjacent the top and bottom of said insert.

5. The pet pager of claim 4 wherein said non-skid material is adhesively bonded to said insert on a side adjacent said outer door panel, said insert frictionally adhering to said outer door panel and said inner side of said channel leg.

6. The pet pager of claim 1 having means for spring mounting the cover plate to said channel comprising threaded studs arranged adjacent the four corners of said channel next to said outer door panel, said studs extending outwardly from the side of the channel facing the outer door panel, said studs being smoothed and recessed and soldered to said channel, a spring and washer placed over the studs, said cover plate being flexibly secured to said channel after fastening by cap nuts.

7. The pet pager of claim 1 wherein a scent favored by the animal is sprayed on said cover plate, said spraying being administered periodically.

* * * * *